June 30, 1936. K. D. LOOSE 2,045,957
CONVEYER FOR BAKING OVENS
Filed Feb. 1, 1935   3 Sheets-Sheet 3
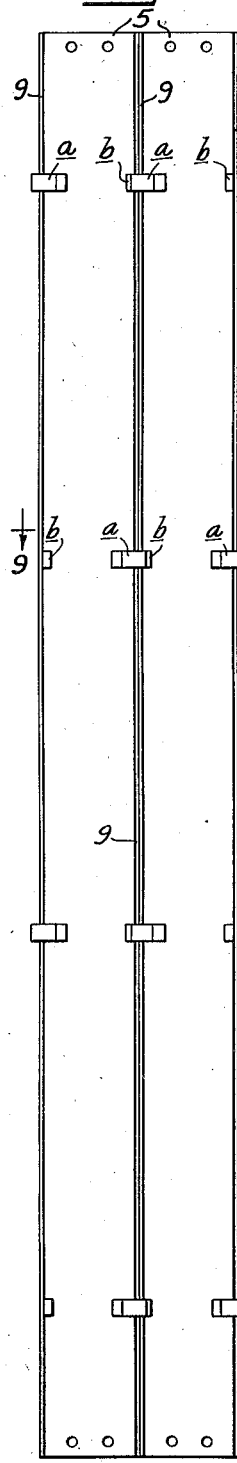
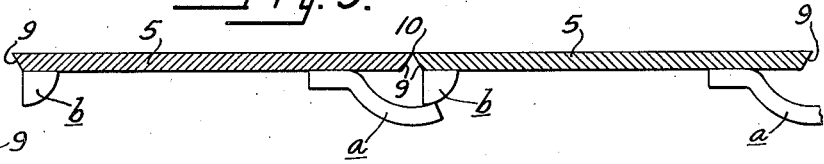
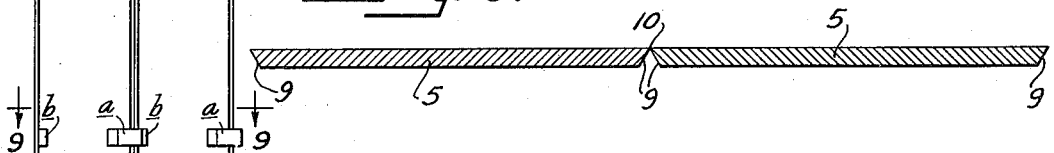
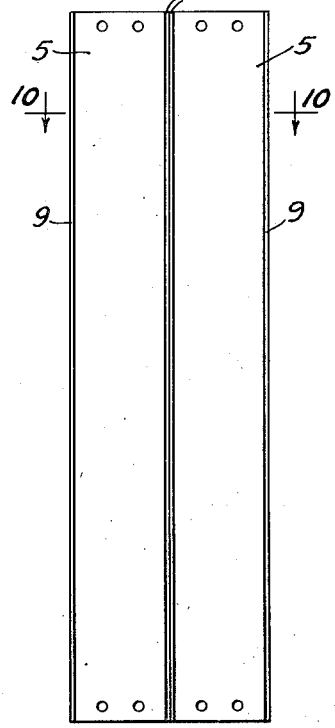
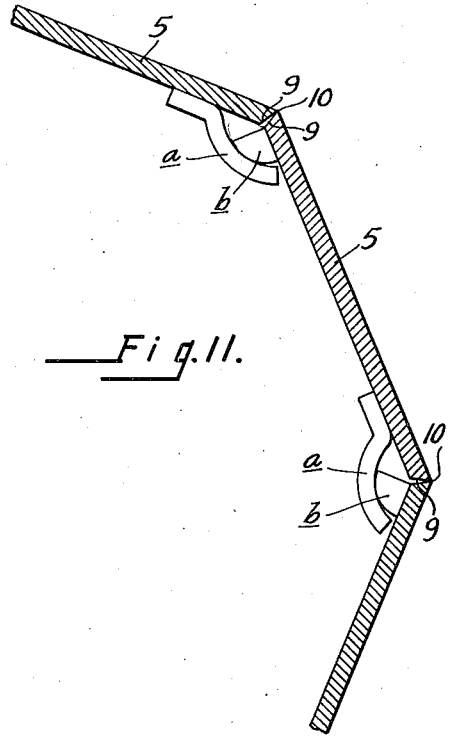
INVENTOR
KENNETH D. LOOSE.
ATTORNEYS Patented June 30, 1936

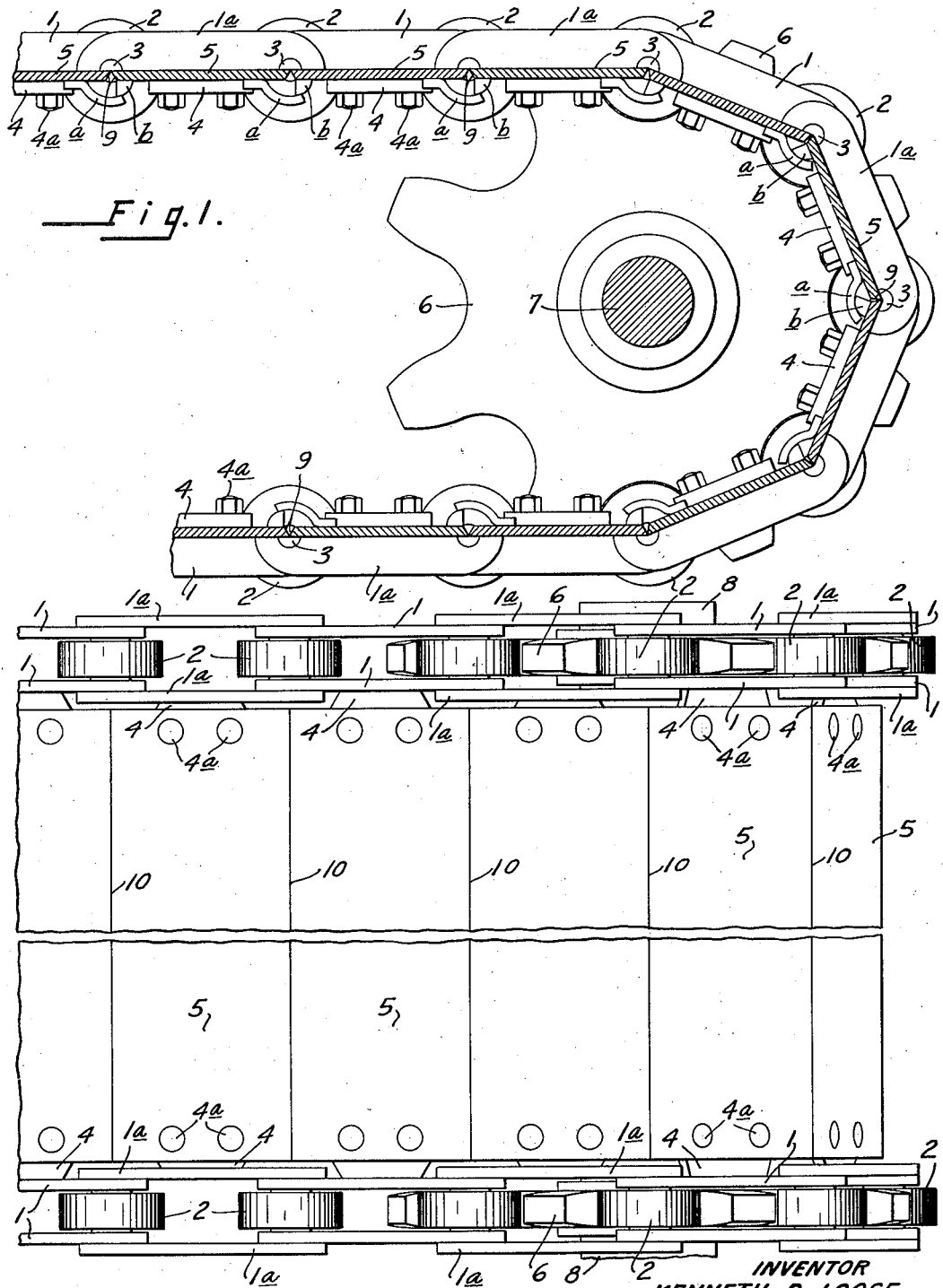

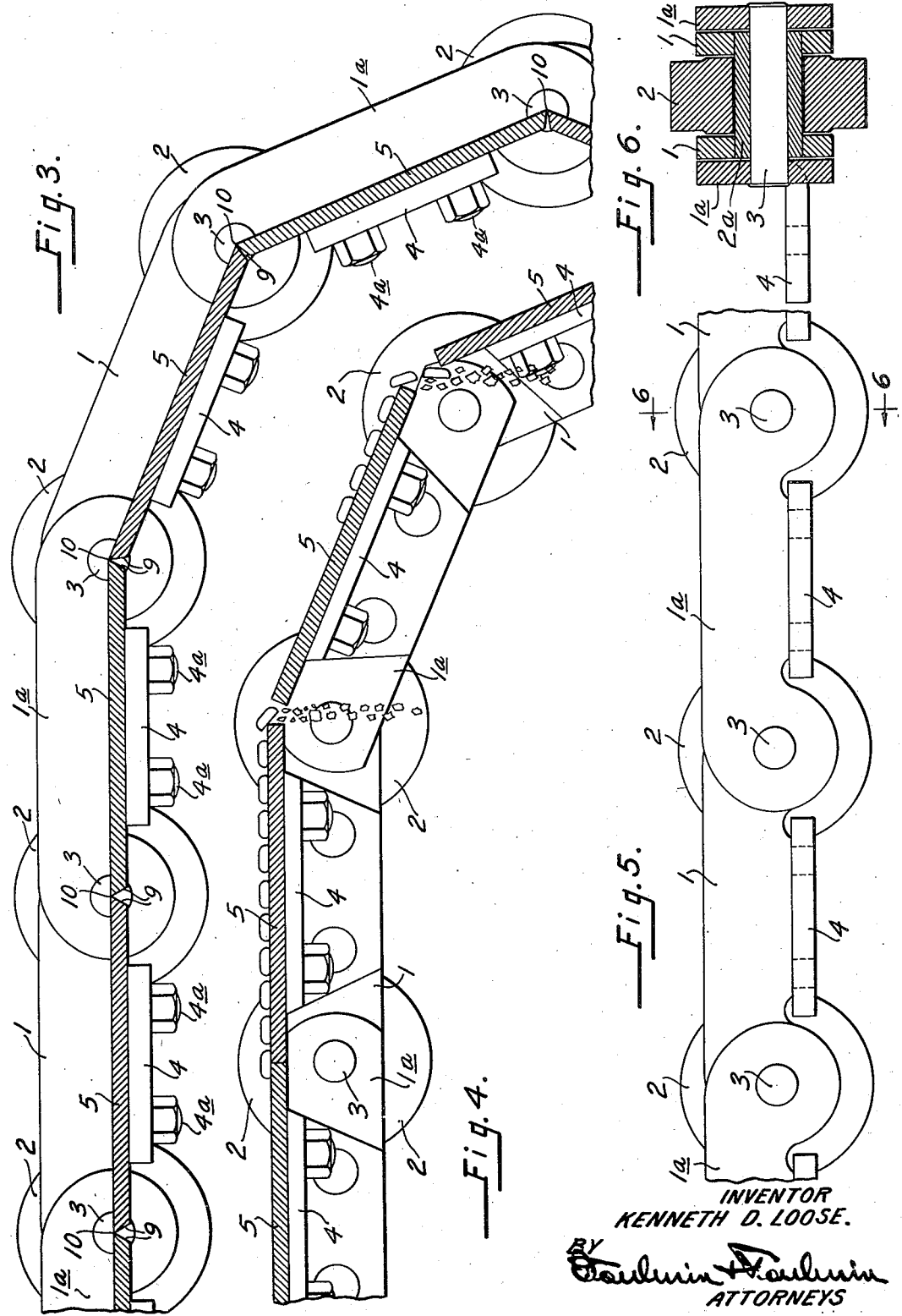

2,045,957

UNITED STATES PATENT OFFICE 2,045,957

CONVEYER FOR BAKING OVENS

Kenneth D. Loose, Bronxville, N. Y., assignor to Loose-Wiles Biscuit Company, Long Island City, N. Y., a corporation of New York Application February 1, 1935, Serial No. 4,528

3 Claims. (Cl. 198—195)

This invention relates generally to baking ovens employed in baking cracker dough and other edible products. The immediate subject matter of this invention lies in the endless conveyers which form that part of such ovens whose function is to receive the dough and to carry such dough until the dough is baked.

The particular object of this invention is to prevent such baked crackers, or any fragments resulting from accidental breakage, from spilling through the gaps between the plates of the endless conveyer and dropping on any machinery down upon the floor, at the place where the conveyer changes its course of direction and travels around suitable wheels or drums at what may be called the end of the course of travel.

Such conveyers are generally made in sections in the nature of transverse plates, placed successively one after another, each plate being fastened to a link in the chain, all the links being interconnected by stud shafts on which are mounted the traveling rollers which roll through the oven from the feeding-end or portion thence to the discharge end, where the conveyer makes its bend through half a circle and returns to what might be called the feeding end or entrance of the oven.

As such conveyers have heretofore existed, their transverse plates when they reach the end of the run through the oven and enter upon a circular return movement, have receded one plate from the other, when they begin to travel through the arc of a circle. This receding of the plates at their opposite edges has produced a gap or open space. Due to the inclined position of the plates at such time, the product or crackers have so frequently slipped or slid across such open gaps as that they have been caught and broken into streams of fragments which have fallen to the floor, and any scraps of the product which may happen to be on the conveyer have also fallen through such gaps formed at this separation of the plates while moving in the arc of a circle. This has caused much loss in the quantity and number of crackers or other product, besides the accumulation of the broken or crushed crackers and scraps.

This defect has in practice required the attendance of at least one or more employees whose duties have been to endeavor to prevent the crackers from sliding into such open spaces, as also to prevent the accidental scraps from adding to the accumulation of the broken product.

With this present invention, no such attendants are required, with the consequent material reduction in the operating cost of each baking oven. With it, the conveyer plates do not recede from each other and open up such spaces or gaps when they change their relative position in going around the arc of a circle at the end of their course. Instead, the plates maintain their continuity, edge to edge, and as they enter or progress in their initial travel in the arc of a circle, the discharge of the crackers and the gathering of them for their transfer to a carrier which takes them ultimately to the place of packing, is facilitated as the unimpaired crackers are then preserved and ready to slide off of the plates on to the place where they are next to go.

There are two factors which enter into the preservation of the continuity of the plates at their meeting edges when traveling through the arc of a turning circle: (a) that of making the upper surface of the plates practically coincident in position with the axes of the centers of the rollers which carry the plate; and (b) in providing plate aliners to keep the plates from springing out of alinement at their adjoining edges when going through the arc of a circle, which provision is made and applied only when the plates are sufficiently long, as in Fig. 7 of the drawings, to cause them to spring out of alinement, as compared with plates whose length is more like that shown in Fig. 8, with which the plate alining, other than the stated relative positions of the upper surfaces of the plates and the roller axes, is not required.

In the accompanying drawings forming a part of this specification:

Figure 1 is a partial vertical longitudinal section, and a partial elevation, of an oven conveyer embodying this invention.

Figure 2 is a plan view of what is shown in Figure 1.

Figure 3 is an enlarged sectional and elevational view such as shown in Figure 1.

Figure 4 is such a view of the type of conveyer heretofore known in which the plates of the conveyer had the serious aforesaid defect of receding from each other and forming openings or gaps when they entered the turning arc.

Figure 5 is a side elevation looking at the inner side of the links which compose the endless chain, showing their ledges upon which the plates are secured, and showing also the rollers.

Figure 6 is a vertical sectional view on the line 6—6 of Figure 5, showing the overlapped ends of the links, the manner of mounting the rollers, and an end view of the ledge on the inner link.

Figure 7 is an inverted plan view of two of the conveyer plates showing the plates and the aliners secured to the plates.

Figure 8 is another inverted view of the plates showing another form of the conveyer plates of a character not requiring the use of the aliners.

Figure 9 is a transverse sectional view taken on the line 9—9, through two of the plates such as shown in Figure 7 with their aliners secured to the plates.

Figure 10 is a sectional view taken on the line 10—10 of Figure 8.

Figure 11 is a further vertical sectional view showing portions of two plates and one full plate in cross section, showing in elevation the plate aliners.

The improved endless conveyer embodying this invention comprises, first, a series of links 1 and 1a and a series of wheels or rollers 2, mounted on spindles 3, which pass through the links and form a shaft on which the rollers revolve. Each link is provided with a shelf or ledge 4, best shown in Figs. 3 and 5. On these ledges are placed and secured, by nuts and bolts 4a, the plates, one plate for each link, such plates being designated by the numeral 5. The links are in pairs, one pair for each two rollers or wheels, as best seen in Figure 2 at 1 and 1a.

These rollers 2 travel on a suitable track or part of the oven through which the conveyer travels during the baking operation. In order to give traveling motion to the endless chain made up of such links and spindles, a sprocket wheel 6 mounted on a shaft 7 is provided. The shaft is supported in suitable bearings as at 8, which are carried by the oven structure. One such equipment of sprocket wheel, shaft and bearings is located in practice at each end of the oven, the one shown being at the discharge end where the product is delivered from the conveyer.

I now come to one of the primary features of this invention, namely, the relation in position of the plates 5 to the centers of the spindles 3. It will be seen particularly in Figs. 1 and 3, that the upper or outer faces of the plates 5 are coincident with the centers of the spindles 3, and that the adjacent edges of each two plates are beveled as indicated at 9. The upper adjacent corners of each two plates practically touch each other and form a line 10, as seen best in Figure 2. When the plates enter the path of the arc of a circle, their beveled edges come closer and closer together until they nearly meet, some clearance being provided by the angle of the bevel.

Viewing Figs. 1 and 3, it will be seen that the upper or outer surfaces of the plates 5 and their corners where two adjacent plates meet, are coincident with the axis of the spindles 3 on which the chain links are pivoted and the rollers or wheels 2 are mounted. This relative position of the plates to the axis of the spindles brings the plates in such relation to each other and to the curve of the travel around the half circle through which the plates move at the end of the travel in one direction, that the plates assume the required angle in making the turn without separating from each other along their adjacent edges to any appreciable extent, instead of parting from each other in the old form of arrangement and construction shown for instance, in Figure 4.

In that figure the plates as they change their angular relation to each other, separate, first, to one extent, and later to a greater extent, making gaps or unoccupied spaces between their adjacent edges. The crackers as they move into these gaps more or less constantly tip into the gaps and are broken or partly crushed, the fragments falling through the gaps and upon the lower stretch of the conveyer beneath, as well as upon the floor. The crackers and fragments which fall through the gaps onto the hot conveyer beneath burn and fill the oven with an acrid smoke which depreciates the flavor of the product in the process of baking. Again, any cracker scraps that may chance to accumulate on the plates also have fallen through such gaps and accumulated below, as just stated. This defect in the old machines, and the resulting broken crackers and scraps which fall through the gaps, has been so serious that the services of one or more operators have been required to manually remove the crackers from the traveling conveyer before the crackers reach the gaps between the plates. The present improvement eliminates that waste, prevents the burning of crackers and fragments which would have fallen through the gaps, and relieves the added cost to the product of the wage of one or more attendants heretofore indispensable.

I regard myself as the first to invent an oven conveyer which, at its discharge end, moves through the arc of a circle and maintains its plates or portions on which the product is carried in such relative position that they do not open up gaps or spaces through which the material under treatment, or the product in that stage, will gather and fall, being more or less broken or crushed and resulting in loss which, being continuous is ultimately serious and heavy.

When the plates, such as those designated 5 in this case, are of considerable length, such as indicated in Fig. 7, so that they will tend to spring more or less out of alinement with each other as they travel in a hot state, and particularly as they move through the arc of a circle in making the turn, they tend to spring apart, and commonly do, and thereby cause gaps between the adjoining plates through which the material under treatment, or scraps of it, will fall.

I have, therefore provided plate aliners which are applied to such springing or flexing plates. These aliners hold the respective plates in alinement along their adjoining edges. These aliners are best shown in Figs. 1, 7 and 9.

In the form shown these aliners consist of inter-engaging members a and b attached to the plates 5. Members a and b effect their inter-engagement by overlapping as best seen in Figs. 1, 9, and 11. When the plates are horizontal or in a straight line, the members assume the position shown in part of Fig. 1 and in Fig. 9. When the conveyer travels in the arc of a circle the members assume the relative position shown in Figs. 1 and 11. In such position the aliners prevent the adjacent edges of the plates from getting out of alinement and causing a space to develop between them, and yet are yieldable or self-adjustable, to the different positions assumed by the plates with respect to each other.

The aliners may be of any number, according to the length of the cross plates 5 which are to be kept in alinement essentially throughout their length along the adjoining edges. The aliners are placed on what may be called the under side of the conveyer plates. This under side is what is shown in Figure 7.

The aliners, as shown in Fig. 7 are distributed along the conveyer plates at suitable intervals to effectively maintain the alinement of the plates one with the other. A good spacing or location of the aliners to accomplish such purpose is shown in Figures 1 and 9 where the plates are assumed to be moving in a straight course, the aliners slightly overlapping or engaging one another. In either position the aliners so cooperate that they maintain plates in alined relation as against any tendency of the plates by reason of their dimensions to get out of alinement. Such alinement for such plates in conjunction with the relative position of the meeting edges of the plates to the center or axis of the pivot pins of the chain links, prevents gaps or open spaces from forming between the adjoining edges of the plates, as before stated.

It will further be observed that in the form of aliners illustrated, one member $a$ is in the nature of a curved finger or projection, while the other member $b$ is in the nature of a block, in shape a quarter segment of a circle. Of course the form of the aliner, as well as the form of the parts of the aliner may vary, that shown being the preferred form. But the substance of the feature is that it is an aliner which acts to maintain, or cause the plates to assume, relative alinement of the plates.

Preferably, as best seen in Figure 11, the curve of the member $a$ has a longer radius than the curve of the member $b$ of the aliner; and preferably also the overlap of the two members need not be more than $\frac{1}{16}$ or so of an inch when the plates are essentially in a straight line. The material of the aliner parts is preferably such as hardened steel which reduces the wear and extends the life of the parts of the aliner. The parts $a$ and $b$ are secured to the plates in any desired manner, but preferably they are welded to the plates. There are no rights or lefts among the plates which carry the aliners as the number and position of the members $a$ and $b$ are the same on the plates that are to be used together, and the members $a$ alternate to project from opposite edges of each plate, while members $b$ are likewise arranged on each plate, except that members $b$ do not project beyond the edges of the plates. This arrangement, the preferred one, is as shown particularly in Fig. 7 of the drawings. The aliners are spaced apart along the edges of the plates in any desired manner, but preferably as also seen in Fig. 7.

In the present instance the crackers and fragments that fall through the gaps between the plates are indicated in Fig. 4 of the drawings where the old style of construction is shown. This has been done to disclose the old form and its defects as compared with the plates and their manner of functioning and protecting the product when the plates reach the arc of the circle in their course.

In Figure 6, the inner links 1 and outer links 1a are shown in cross section, as also a roller or wheel 2 and a sleeve or bushing 2a, mounted in the spindle 3. This construction operates very well.

And I also regard myself as the first to provide plate aliners which act to keep in alinement the adjoining edges of conveyer plates when they make their travel through the arc of a circle as well as when they travel in a straight line.

And I further regard myself as the first to combine the aforesaid relative position of the conveyer plates to the axis of the conveyer rollers, with this plate aliner, so that by this combination gaps or open spaces between the plates as they travel in the arc of a circle are prevented, regardless of the length or tendency of the plates to get out of alinement due to their length or condition.

Finally, it will be noted that the coincidence as between the center or axis on which the links move or the rollers revolve, with the adjacent portion of the conveyer plates, constitutes of such center and such plates a gap-eliminator, which I regard as a new and important feature which I am entitled to cover broadly.

It will be understood that I desire to comprehend within my invention such modifications as may be necessary to adapt it to varying conditions and uses.

Having thus fully described my invention, what I claim is new and desire to secure Letters Patent on, is:

1. In a conveyer for baking ovens, the combination with conveyer plates planar throughout their length and having beveled adjoining edges constantly in approximate contact both when the plates are traveling in a substantially straight path and in a curved path, said bevels functioning to permit maintenance of the proximity of the edges of the plates when traveling in a curved path, of plate aliners secured one to each plate adjacent to the adjoining edges thereof with overlapping portions adapted to travel on each other and maintain the plates in alinement with each other, said plate aliners comprising paired interengaging blocks of arcuate cross section and hooks defining complementary internal surfaces spaced longitudinally of the plates adjacent the engaging edges thereof.

2. In a conveyer for baking ovens, the combination with conveyer plates having beveled adjoining edges constantly in approximate contact both when the plates are traveling in a substantially straight path and in a curved path, said bevels functioning to permit maintenance of the proximity of the edges of the plates when traveling in a curved path, of alining means, comprising alternate inter-engaging male and female parts defining arcuate bearing surfaces coaxial with the line of contact of the plate edges secured to the undersides of the respective plates adjacent to the beveled edges thereof and longitudinally spaced relative to the length of the plates.

3. In a conveyer for baking ovens, the combination with conveyer plates planar throughout their length having beveled adjoining edges constantly in approximate contact both when the plates are traveling in a substantially straight path and in a curved path thereby forming a substantially continuous surface of their outer faces, of paired interengaging plate aliners comprising transversely spaced arcuate blocks disposed adjacent the plate edges throughout their length and interengaging with hook members defining complementary female bearing surfaces coaxial with the line of contact of the adjacent plate edges, said plates when in their substantially straight path forming a substantially planar support.

KENNETH D. LOOSE.